United States Patent [19]

McCullough et al.

[11] Patent Number: 4,725,136

[45] Date of Patent: Feb. 16, 1988

[54] METHOD FOR MEASURING PARTICLE VELOCITY USING DIFFERENTIAL PHOTODIODE ARRAYS

[75] Inventors: James R. McCullough, Falmouth; Yogi C. Agrawal, Hatchville, both of Mass.

[73] Assignee: The United States of America as represented by the Secretary of the Navy, Washington, D.C.

[21] Appl. No.: 374,557

[22] Filed: May 3, 1982

[51] Int. Cl.[4] .............................................. G01C 3/36
[52] U.S. Cl. ..................................... 356/28; 356/28.5
[58] Field of Search ................................. 356/28.5, 28

[56] References Cited

U.S. PATENT DOCUMENTS

| | | | |
|---|---|---|---|
| 3,532,427 | 10/1970 | Paine | 356/28.5 |
| 3,795,447 | 3/1974 | Welch et al. | 356/28.5 |
| 3,830,568 | 8/1974 | Allen | 356/28.5 |

FOREIGN PATENT DOCUMENTS 0529660 11/1979 U.S.S.R. .............................. 356/28.5

OTHER PUBLICATIONS

Blake, et al, "A Traversing Laser Velocimeter," Optics and Laser Tech., vol. 3, No. 4, 11/71–pp. 208–210.
Agrawal, et al, "Directional Pedestal–Free Laser Doppler Velocimetry Without Frequency Biasing, Part 1," Applied Optics, vol. 20, No. 9, 5/81–pp. 1553–1556.
Greated, C., "Velocity Measurement in Air with a Scattering Interferometer," ICIASF '71 Record, 6/71–pp. 152–156.
Oldengarm, et al, "Velocity Profile Measurements in a Liquid Film Flow Using the Laser Doppler Technique," J. of Physics E: Scientific Instr., vol. 8, 1975–pp. 203–205.
Wang, C. P., "Doppler Velocimeter Using Diffraction Grating and White Light" Applied Optics, vol. 13, No. 5, 5/74–pp. 1193–1195.
Ogiwara, H., "Laser Doppler Velocimeter with a Differential Photodiode Array," Applied Optics, vol. 18, No. 10, 5/79–pp. 1533–1538.

Primary Examiner—Stephen C. Buczinski
Attorney, Agent, or Firm—Prithvi C. Lall; Arthur A. McGill; Michael J. McGowan

[57] ABSTRACT

A method for measuring the velocity of a scatterer in a moving fluid by examining the spatial structure of the optical field on the detector of a Laser Doppler Velocimeter (LDV). The optical field after scattering from the laser beam is a traveling wave of a shape dependent on the detector optics alone. A pair of differential linear arrays are used to find the direction of velocity of the traveling wave and hence that of the scatterer. Furthermore, this method eliminates the Doppler pedestal which requires high pass filter in most of the conventional methods.

8 Claims, 3 Drawing Figures

METHOD FOR MEASURING PARTICLE VELOCITY USING DIFFERENTIAL PHOTODIODE ARRAYS

BACKGROUND OF THE INVENTION

The present invention is related to a method of measuring fluid velocity using a LDV and, more particularly, to a method which uses two linear differential arrays of photo detectors.

The measurement of localized fluid velocity by the laser Doppler method has developed along classical heterodyne techniques. Such methods involve mixing of the Doppler-shifted scattered laser beam with a reference beam using a conventional heterodyne method. The beat frequency of the scattered beam and the reference beam is then measured to determine the velocity of the scatterer and thus the fluid velocity. A dual-scatter or dual-differential Doppler method was proposed later in which the scattering particle is illuminated by two beams derived from the same laser and mixing is accomplished only between the scattered light. This mode has been preferred because of superior signal-to-noise (S/N) ratio and the ease of alignment in most practical situations. A conventional Laser Doppler Velocimeter (LDV) uses a single photosensor as the optical mixer, detecting the full power of optical signals. However, in both of these methods, there exists an uncertainty as to the direction of motion of the scatterer. Rotating radial gratings or Bragg cells have been used to resolve this directional ambiguity. These devices introduce a zero-velocity frequency offset in the linear frequency-to-velocity relation. Furthermore, Doppler pedestal (i.e. the presence of a constant level instead of Zero level) has to be removed by high-pass filtering the Doppler signal prior to signal processing on period counting electronics. It is thus desirable to have a simple technique for measuring the fluid velocity or the velocity of the scatterer therein which does not use complicated optical components such as Bragg cell or radial grating as mentioned above.

SUMMARY OF THE INVENTION

The principle of the new technique of measuring fluid velocity according to the teachings of subject invention includes treating the scattering particle as a small or a point light source and setting up a diffraction-limited image on the detector surface through the diffraction of light by the receiving optics including a plurality of slits. It can be demonstrated theoretically that when such diffraction-limited image of the scatterer is formed, it represents a traveling wave (i.e. a fringe train) on the detector plane. The direction of travel of the fringes so formed determines the direction of motion of the fluid. This technique is thus practiced by using a plurality of lenses to condition the scattered laser light and a plurality of slits which form diffraction limited images of the scatterer in the fluid in motion. Two differential linear arrays of photodiodes are then used at the image plane. The output of the two differential linear arrays is electronically processed to determine the velocity (magnitude and direction) of the scatterer and hence the velocity of the fluid.

An object of subject invention is to have a method of determining the velocity of a moving fluid which eliminates beam splitting optics.

Another object of the subject invention is to have a method of determining fluid velocity which is free of directional ambiguity.

Still another object of the subject invention is to have a technique of determining fluid velocity which is free of Doppler pedestal.

Still another object of the subject invention is to have a method of determining fluid velocity which is free of complicated optics using radial gratings or Bragg cells.

Other objects, advantages and novel features of the invention will become apparent from the following detailed description of the invention when considered in conjunction with the accompanying drawings wherein:

DESCRIPTION OF A PREFERRED EMBODIMENT

Figure 1:
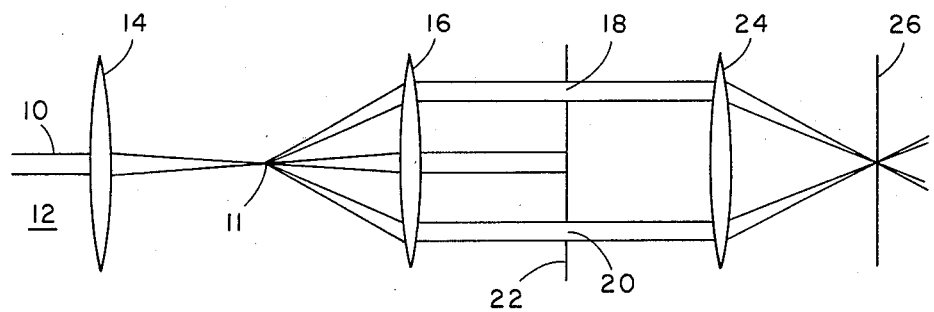
FIG. 1 is a schematic representation of the method using Laser Doppler Velocimeter (LDV) using two slits.
Figure 2:
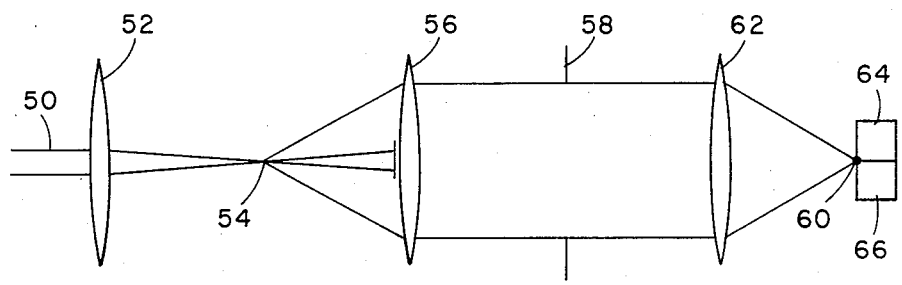
FIG. 2 is a schematic representation of a method using a Laser Doppler Velocimeter (LDV) with large aperture.
Figure 3:
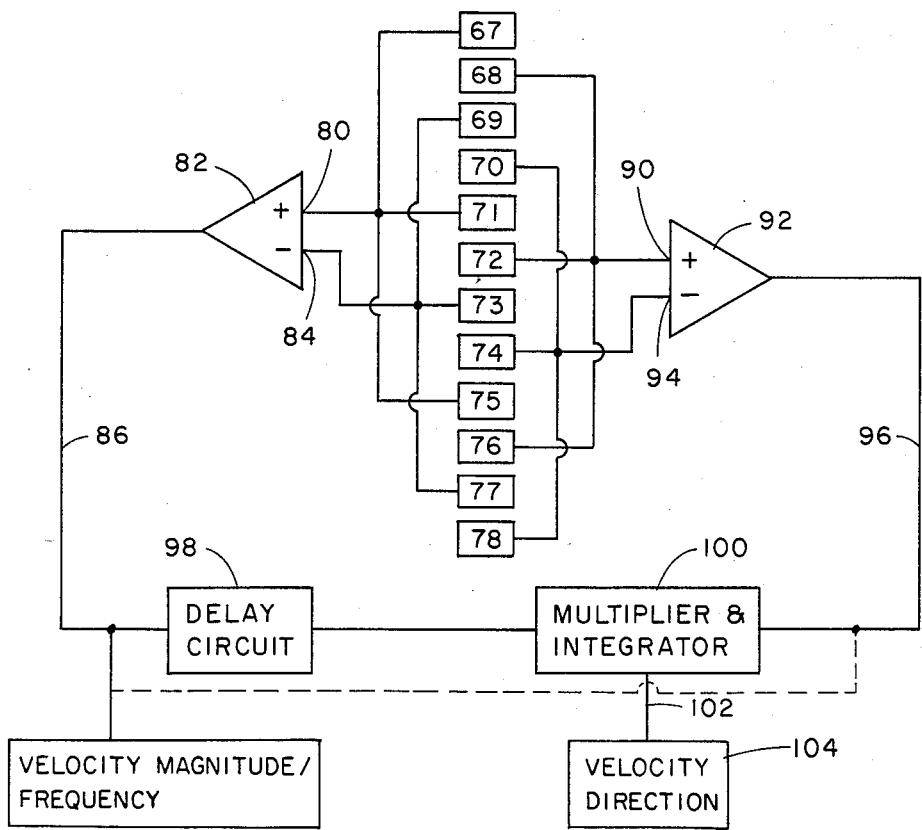
FIG. 3 is a schematic representation of the arrangement used for processing the photocurrent from photodiodes.

FIG. 1 is a schematic representation of subject technique using a simple geometry. A single $TEM_{oo}$ laser beam 10 illuminates a particle acting as a scatterer located in plane 11 which is the front focal plane of lens 14 and back focal plane of lens 16. Lens 14 acts as a condensing lens focusing the incident laser beam at the particle (i.e. scatterer) located at 11. Lens 16 converts the incident spherical wave fronts of the scattered laser light to planar wave fronts which are diffracted by two parallel symmetrical slits 18 and 20 at plane 22. The diffracted laser beam is then focused by lens 24 onto detector plane 26 where Young's fringes are formed. A pair of differential linear photodiode arrays are placed at the focal plane 26 to process the diffracted image of scatterer located at point 11. However, the arrangement of FIG. 1 gives rise to weak signals because of the use of two slits and loss of intensity of the scattered laser light. FIG. 2 is a more desirable arrangement because of the fact that all the scattered light passing through a large aperture is used as opposed to the contribution coming from the slits 18 and 20 of FIG. 1. As is the case in FIG. 2, laser beam 50 falls on condensing lens 52 which focuses it on a scatterer located at 54. The scattered light, as shown in FIG. 2, is converted into planar wave fronts by lens 56. The scattered beam after passing through lens 56 is passed through aperture 58 and then is focused onto an image point 60 by using a condensing lens 62. The diffraction pattern formed at the image plane 60 represents the diffracted image of the scatterer located at 54. A plurality of photodiodes are placed at image plane 60 to form two differential photodiode linear arrays 64 and 66. The arrangement of photodiodes is shown in FIG. 3 where twelve diodes 67–68 are used to form identical arrays 64 and 66. As shown in FIG. 3, photodiodes 67, 71 and 75 have their outputs combined together and fed to terminal 80 (positive terminal) of operational amplifier 82 and photodiodes 69, 73 and 77 have their outputs combined together and connected to terminal 84 (negative terminal) of the operational amplifier 82. The output 86 of operational amplifier 82 represents the output of linear array 64. Photodiodes 68, 72 and 76 have their outputs connected together and connected to terminal 90 (positive terminal) of operational amplifier 92 and photodiodes 70, 74 and 78 have their outputs connected together and fed into input terminal 94 (negative terminal) of operational amplifier 92. Output 96 of operational amplifier 92 represents the output of photodiode linear array 66. Outputs 86 and 96 of photodiode linear arrays 64 and 66 are 90° out-of-phase, because arrays 64 and 66 are identical except that they are offset by one photodiode spacing. Output of array 64 is further delayed by one quarter of a period or phase shifted by 90° using delaying circuit 98 and is then combined with output 96 in a multiplier and integrator unit 100. As shown in FIG. 3, the output 102 of unit 100 is fed to velocity direction meter 104 which provides the information as to the direction of motion of the scatterer. The algebric sign of the output 102 indicates the direction of motion of the scatterer, i.e. if output 102 is positive, the scattering particle is moving in one direction and if output 102 is negative, the scattering particle is moving in the opposite direction. The output 102 is then fed to box 104 which determines the direction of motion of the scatterer. The frequency of the photocurrent coming out as output 86 or 96 gives the magnitude of the velocity of the scatterer and hence the velocity of the moving optical wave front. Conventional LDV frequency trackers or counters are used for determining the frequency of output 86 or 96. It should be clearly understood that the number of photodiodes shown is for illustration purposes only, rather than as a limitation on the teachings of the subject invention. Furthermore, the optical components used such as lenses 14, 16, 24, 52, 56, and 62 can be so chosen that the image of the scatterer is formed at the image plane. The photodiodes used for these arrays are of relatively small dimensions. As an example, the photodiodes used were of 25 microns center-to-center dimension. The diodes in the arrays are at equal distance from one another. It should further be noted that various components in subject technique of finding the direction and magnitude onto fluid velocity are mostly off-the-shelf items and can be substituted by their equivalents without any limitation.

Briefly stated, the technique of finding magnitude and direction of velocity of a moving fluid using a Laser Doppler Velocimeter as taught by subject invention includes an optical arrangement by which the image of a scatterer in the moving fluid is formed at a focal plane where a pair of differential linear photodiode arrays are located to find the frequency of the photocurrents. The delayed correlation of the photocurrent from the two diode arrays is used to find the direction of the motion of the scatterer.

Obviously, many modification and variations of the subject invention are possible in the light of the above teachings. As an example, the focal lengths of the various lenses used can be changed to optimize the geometry of the system. Furthermore, the dimensions of the photodiodes used for the arrays can be selected to optimize the results. It is, therefore, to be understood that within the scope of the appended claims, the invention may be practiced otherwise than as specifically described.

What is claimed is:

1. A method for measuring the velocity (magnitude and direction) of a moving particle, acting as a scatterer of light from a light source, using at least a pair of differential linear photodiode arrays, optical means and a light diffracting means, which includes the steps of:
    scattering light from the light source using the moving particle as the scatterer;
    diffracting the scattered light by the light diffracting means forming a light diffracted image using the optical means; and
    processing the light diffracted image using the pair of differential linear photodiode arrays to obtain the velocity of the moving particle.

2. The method of claim 1 wherein the step of scattering light from the light source further includes focusing the light source beam on the particle acting as the scatterer.

3. The method of claim 2 wherein the step of diffracting the scattered light by the light diffracting means includes allowing the scattered light to pass through a wide aperture as the light diffracting means in order to improve signal-to-noise ratio for the light diffracted image.

4. The method of claim 2 wherein the step of diffracting the scattered light by the light diffracting means includes allowing the scattered light to pass through at least a pair of slits to obtain the light diffracted image.

5. The method of claim 3 wherein the step of processing the light-diffracted image using the pair of differential linear photodiode arrays includes delaying the output of one of the two differential linear photodiode arrays of the output traveling wave to obtain the direction of velocity of the moving particle.

6. The method of claim 5 which further includes the step of focusing the scattered light after diffraction using the optical means.

7. The method of claim 3 wherein the step of processing the light-diffracted image using the pair of differential linear photodiode arrays includes the frequency of the output signal of the pair of differential linear photodiode arrays representing light intensity variation of the light-diffracted image to obtain the magnitude of velocity of the moving particle.

8. The method of claim 7 wherein the step of processing the light-diffracted image using the pair of differential linear photodiode arrays further includes determining the polarity of the output signal of the pair of differential linear photodiode arrays which provides the direction of the velocity of the moving particle.

* * * * *